United States Patent [19]

Frederiksen

[11] Patent Number: 4,685,678
[45] Date of Patent: Aug. 11, 1987

[54] POSITION TRANSDUCER SYSTEM FOR A JOYSTICK

[75] Inventor: Jeffrey E. Frederiksen, Arlington Heights, Ill.

[73] Assignee: Bally Manufacturing Corporation, Chicago, Ill.

[21] Appl. No.: 713,482

[22] Filed: Mar. 19, 1985

Related U.S. Application Data

[63] Continuation of Ser. No. 408,004, Aug. 13, 1982, abandoned.

[51] Int. Cl.[4] .............................................. A63F 9/22
[52] U.S. Cl. ................................. 273/148 B; 336/131; 336/136; 340/709; 364/190; 273/1 E
[58] Field of Search ............ 273/85 G, 1 E, DIG. 28, 273/148 B; 324/340, 74; 336/118, 130, 131, 133, 136; 331/181; 340/709, 724, 807, 761; 374/22; 364/190

[56] References Cited

U.S. PATENT DOCUMENTS

| | | | |
|---|---|---|---|
| 3,621,214 | 11/1971 | Romney | 340/711 |
| 3,891,918 | 6/1975 | Ellis . | |
| 4,134,065 | 1/1979 | Bauer et al. | 336/136 |
| 4,138,632 | 2/1979 | Pauwels et al. . | |
| 4,148,014 | 4/1979 | Burson . | |
| 4,187,462 | 2/1980 | Haker et al. . | |
| 4,284,961 | 9/1981 | Landau . | |
| 4,297,698 | 10/1981 | Pauwels et al. | 336/136 |
| 4,305,007 | 12/1981 | Hughes . | |
| 4,306,208 | 12/1981 | Coors | 336/136 |

FOREIGN PATENT DOCUMENTS

0041281 12/1981 European Pat. Off. .
2062237 5/1981 United Kingdom .
2091423 7/1982 United Kingdom .

OTHER PUBLICATIONS

IBM Technical Disclosure Bulletin, vol. 12, No. 6, Nov. 1969, "Joy Sphere", P. E. Stuckert, pp. 769-770.
IBM Technical Disclosure Bulletin, vol. 19, No. 9, Feb. 1977, "Digital Encoding of Joystick Position", B. L. Holloway, pp. 3612-3613.
IBM Technical Disclosure Bulletin, vol. 23, No. 7B, Dec. 1980, "Single-Shot Control for Joystick or Thumbwheel", D. F. McManigal et al, pp. 3323, 3324.

Primary Examiner—Richard C. Pinkham
Assistant Examiner—MaryAnn S. Lastova
Attorney, Agent, or Firm—Jenner & Block

[57] ABSTRACT

A joystick position transducer system for use in a video game. The joystick position transducer includes a pair of inductors each having a movable slug, the slugs being coupled to a control handle or knob by means of respective linkages. The control handle or knob is responsive to external stimulus to move the slugs, the inductors providing respective first and second analog signals which are proportional to the position of the slugs. Coupled to each of the inductors is an oscillator and counter for providing a pulsed output, the pulse width of which is proportional to the position of the respective slug. A controller, such as a computer control or logic sequence circuit, is provided to control the oscillators and counters. The controller is further responsive to the counter outputs to control a display presentation on a video display coupled thereto.

39 Claims, 12 Drawing Figures

POSITION TRANSDUCER SYSTEM FOR A JOYSTICK

This is a continuation of application Ser. No. 408,004 filed Aug. 13, 1982, now abandoned.

This invention relates to position transducers and more particularly to an interactive position tranducer apparatus, especially in conjunction with a video game system.

Heretofore, position transducers, and specifically joysticks, have utilized multiple leaf switches for end point limit detection, particularly for providing an input interface from a user to a video game. For example, four leaf switches, two for x direction and two for y direction, have been utilized in conjunction with a video game system to control the cursor display on a cathode ray tube. In the non-video game area, position transducers have utilized a variable inductor coupled to a handle to generate an oscillating output at a frequency proportional to the inductance. This oscillating signal has then been coupled via a communications line to a remote controller which then counts the number of pulses from the oscillator to relate the oscillator frequency to positional information as to the handle position. However, this approach presents numerous problems, such as high radiated energy and related EMI (electromagnetic interference) and RFI (radio frequency interference) problems. Additionally, coupling of multiple oscillator outputs back to the remote controller can result in cross talk between the oscillating signals as well as interference between the variable inductors in the multiple oscillator circuitry. One approach at solving this problem is disclosed in U.S. Pat. No. 4,148,014, by Burson, wherein a wiper matrix of finger contacts are coupled between a joystick handle and each of x and y wiper matrices. The output from the joystick is a digitally encoded multiple bit word corresponding to one of the predefined number (e.g. 16) of possible x (and likewise for y) positions of the joystick. These digital words are communicated to a remote controller which correlates the joystick movement to movement of a cursor on a display cathode ray tube. However, this approach is relatively expensive, and is limited in the response characteristics which can be obtained from the joystick. While this system does reduce RFI and EMI radiation, it does so as the expense of requiring multiple digital control lines for each of the x and y direction outputs to be coupled the distance from the joystick to the controller.

Other types of prior position transducers have included absolute function generators such as encoder based sine-cosine transducers. For example, a gray code encoder would be comprised of rings with wipers such that movement of a control knob resulted in an encoded gray code output responsive to the position of the wipers along the rings. The disadvantage of this type transducer is the tendency to wear out, the requirement for a plurality of output lines representing the encoded output, and a relatively high cost. To overcome the wear problem, optical encoders have been utilized, such as an x-y roller ball slot encoder. However, this type of device requires two opto-detectors on each axis of movement, and optical encoders are expensive. Additionally, logic is required to determine the number of rotations to derive the direction in count. The typical output of the slot encoder is a clock pulse and a data pulse generated from the movement of the roller ball or other control handle. This type of encoder is a relative encoder with no physical zero point. The relative encoder has only limited fields of application, and the high cost plus the requirement for support logic circuitry further restrict its use.

Accordingly, it is an object of the present invention to overcome many of the disadvantages of the prior art systems.

It is another object of the invention to communicate relatively high resolution positional data from the position transducer to a remote controller utilizing a low frequency signal, thereby minimizing RFI and EMI problems.

In accordance with one of the illustrated embodiments of the invention, a multi-axis joystick is comprised of a handle, two inductors, each inductor having a moveable slug and providing an output responsive to movement of the respective slug, and having linkage for coupling movement of the handle in a respective direction to a respective slug to generate appropriate outputs. In one embodiment, the inductors form part of a pulse generating circuit. In an alternate embodiment, the inductors form part of an oscillator circuit, which provides an oscillating output. The oscillating outputs from the two oscillating circuits can be coupled in parallel to respective counters which are remotely reset (from a remote controller) and which provide an output when a predefined count is reached. Alternatively, the oscillating circuits can be selectively enabled/disabled and coupled in a sequential manner to a single resettable counter to provide two outputs in a time-division multiplexed-pulse width modulated (TDM-PWM) format. Thus, the counter output is scaled down to a lower frequency than the oscillator output, providing a low frequency counter output for coupling to the remote controller. In one embodiment, the multi-axis joystick is part of a video game system including a display, and means for displaying video game action and movement of at least a portion of the display responsive to positional data derived from the pulse or counters outputs. In yet another embodiment, the multi-axis joystick provides 360° response characteristics from the joystick outputs. Thus, movement of a portion of the displayed video game action is effected responsive to 360° positional data from the multi-axis joystick. Furthermore, in another embodiment, means are provided for converting joystick data to acceleration data, which in the video game system produces an accelerated movement of a portion of the displayed video game action responsive to the joystick movement.

These and other objects and advantages of the present invention will become readily apparent upon consideration of the following specificaton and attached drawings, wherein.

Figure 1A:
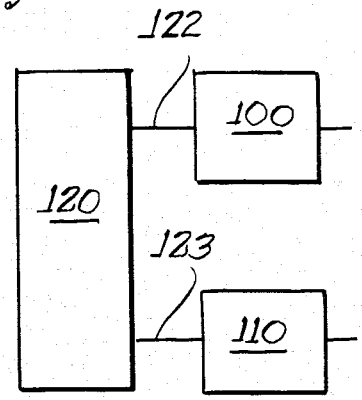
FIG. 1A is a block diagram of a positional transducer in accordance with one embodiment of the present invention.

Referring to FIG. 1A, a position transducer is shown comprising a reactive input transducer for converting user actions to positional data signals. It is comprised of a reactive input transducer 120 for converting user actions to first and second analog signals 122 and 123, respectively, and first means 100 and second means 110 for producing respective pulse outputs having variable width responsive to said first and second analog user signals, respectively. The reactive input transducer can be of many forms, as described hereinafter.

Figure 1B:
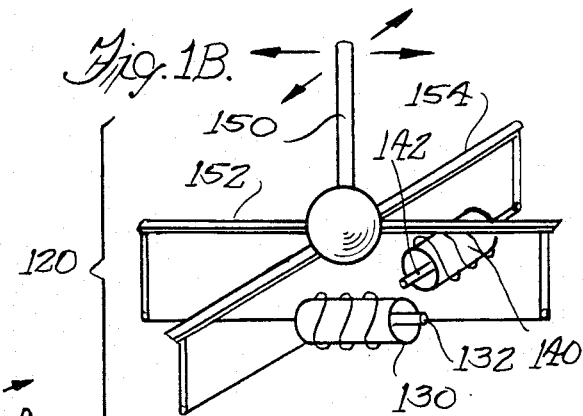
FIGS. 1B-1C are perspective views of alternate embodiments of physical apparatus illustrating the position transducer of FIG. 1A.

Referring to FIG. 1B, a perspective view of a physical embodiment of an input transducer 120 is shown. The position transducer is comprised of a first inductor 130 having a first moveable slug 132 for producing a first signal proportional to the position of the first slug, and a second inductor 140 having a second moveable slug 142 for producing a second signal proportional to the position of the second slug. The position transducer is further comprised of a control handle 150 for moving at least one of the first and second slugs, 132 and 142, respectively, responsive to an external stimulus, such as physical movement of the handle by the player. As illustrated in FIG. 1B, the control handle 150 includes means 152 and 154 for linking physical movement of the control handle to each of the first and second slugs.

Figure 1C:
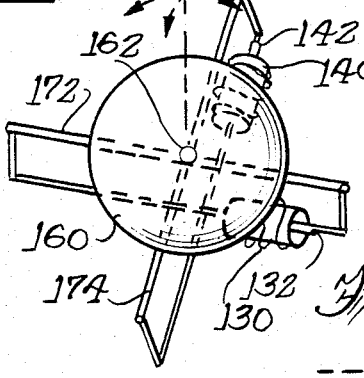

Referring to FIG. 1C, a perspective view of an alternate physical embodiment of an input transducer 120 is shown in FIG. 1A. The position transducer is comprised of a knob 160 having a pin 162 coupled thereto at a point off center from the center of the knob 160. The position transducer is further comprised of a first inductor 130 having a first movable slug 132 for producing a first signal proportional to the position of the first slug, and a second inductor 140 having a second movable slug 142 for producing a second signal proportional to the position of the second slug. Means 172 and 174 provide linkage for coupling movement of the knob 160 via the pin 162 to the first and second slugs, respectively, so as to cause corresponding movement of the slugs 132 and 142 within the respective cores of the respective inductors. Thus, this embodiment of the position transducer utilizing a knob linking the slugs together via a pin can replace an x-y joystick of the handle type, and also provides for an angular transducer, such as providing a sine-cosine relationship.

Figure 2A:
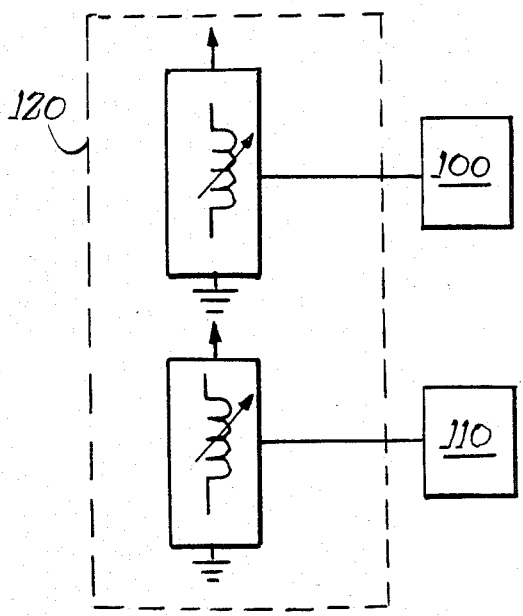
FIGS. 2A-2B illustrate different embodiments of the elements 100 and 110 of FIG. 1A.
Figure 2B:
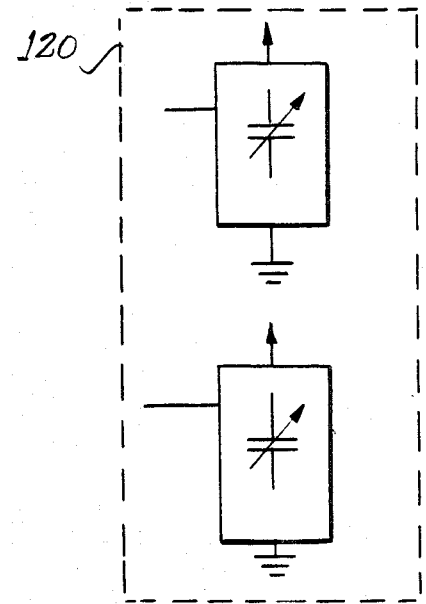

Referring to FIGS. 2A–2B, alternate embodiments of the reactive portion of the input transducer 120 are shown. The reactive portion can be comprised of variable inductors each having a respective moveable slug, such as shown in FIG. 2A, or may alternatively be comprised of variable capacitors as shown in FIG. 2B.

Figure 3A:
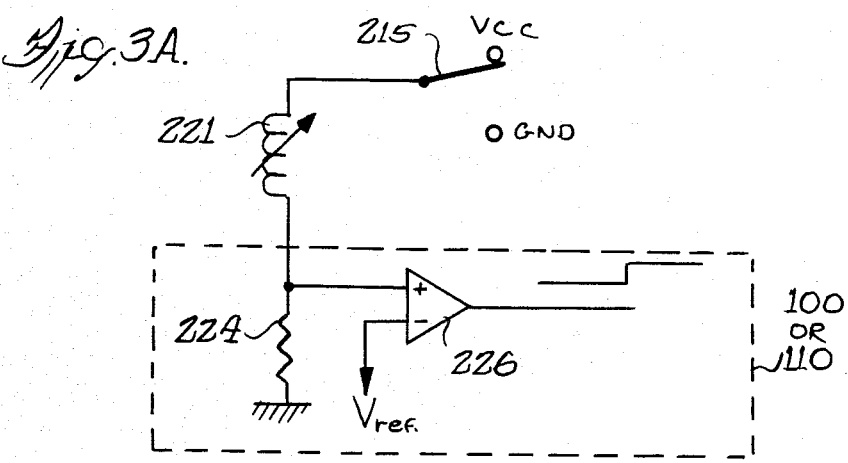
FIG. 3A is an electrical schematic of one embodiment of a pulse generating inductor based position transducing means, such as 100 or 110 of FIGS. 1A-1B.
Figure 3B:
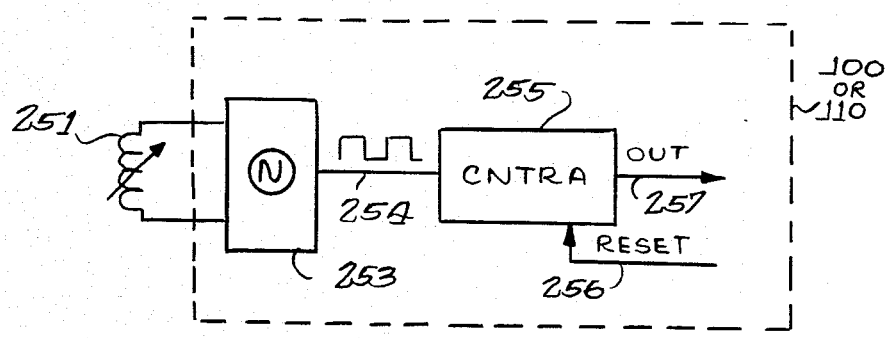
FIG. 3B is an electrical diagram illustrating a positional transducer for generating a pulse output having a variable inductor based oscillator and a counter, illustrating another embodiment of the position transducer, such as 100 or 110 of FIGS. 1A–1B.

Referring to FIGS. 3A–3B, alternate methods of producing signal outputs responsive to positional movement of a slug in a variable inductor are shown. It will be understood that these circuits could also utilize variable capacitors, and even variable resistors. However, in conjunction with a video game, the variable inductor provides a cost effective component providing excellent reliability and good user feel, and shall therefore be the illustrated variable transducer component illustrated hereinafter. The means 100 and 110 can be identical or different, and in the illustrated embodiments of FIGS. 4–5 are shown as identical. The means 100 and 110 can provide either a direct pulse output, as shown in FIG. 3A, or an oscillating output which can be converted to a pulse output by counter/divider circuitry, as in FIG. 3B, shown as interacting with an external controller.

Referring to FIG. 3A, the variable inductor 221 of the reactive input transducer 120 is coupled via switch 215 to either the positive supply voltage Vcc or to ground. The other end of the variable inductor is coupled to resistor 224 and to the non-inverting input of amplifier 226. The inverting input of amplifier 226 is connected to a reference voltage Vref which determines the threshold at which the amplifier switches to provide the pulse output. The other end of resistor 224 is coupled to ground. In operation, when power is applied (Vcc coupled to the inductor 221) no current initially flows through the inductor, and the initial voltage output of the amplifier 226 is at ground. The time it takes for the necessary current flow to build and pass through the inductor 221 is proportional to the inductance which in turn is determined by the position of the slug within the core of inductor 221. When sufficient current passes through the inductor 221 and therefrom through resistor 224, a voltage is generated across resistor 224 which is coupled to the non-inverting input of amplifier 226. When the voltage at the non-inverting input of amplifier 226 exceeds the reference voltage Vref (at the inverting input of the amplifier 226), the output of amplifier 226 is brought to a high voltage level, thereby generating the pulse. The time interval from coupling the inductor 221 to Vcc until the output of amplifier 226 switches to a high voltage level output is proportional to the inductance of the variable inductor 221 which in turn depends on the position of the slug within the core of the inductor 221 which relates to the movement of the joy stick. Thus, the time interval represents positional data which can be used by a remote (or local) external system, such as a video game.

Referring to FIG. 3B, an alternate embodiment of a means for producing a signal proportional to the position of the variable inductor slug is shown, illustrating an oscillator and counter combination circuit embodiment of the means 100 or 110. A variable tuning element, inductor 251, controls the frequency of oscillation of an oscillator 253 which provides an oscillating output 254. The oscillator output 254 is coupled to the clock input of a counter means 255. A reset signal 256 is also coupled to the counter means 255, the reset signal selectively forcing the counter means stored count to a predetermined count value, e.g., zero. The stored count in the counter means is incremented responsive to the oscillator output, and a counter output 257 is provided responsive to the counter means count value incrementing to a predefined value, e.g., a count reached output. The utilization of the counter 255 in conjunction with the oscillator 253 and variable inductor 251 allows a smaller inductor coil 251 to be utilized while providing a low frequency output. Thus, even though the smaller inductor coil 251 results in a higher frequency of oscillation for the oscillator 253 than would result from a larger coil, the counter 255 scales the frequency down by the factor of the predefined count value to result in a low frequency output. Alternatively, a large inductor coil 251 could be utilized without the need for counter 255 to achieve the same output frequency result. However, the smaller coil is more practical and of much lower cost than a larger coil.

Figure 4A:
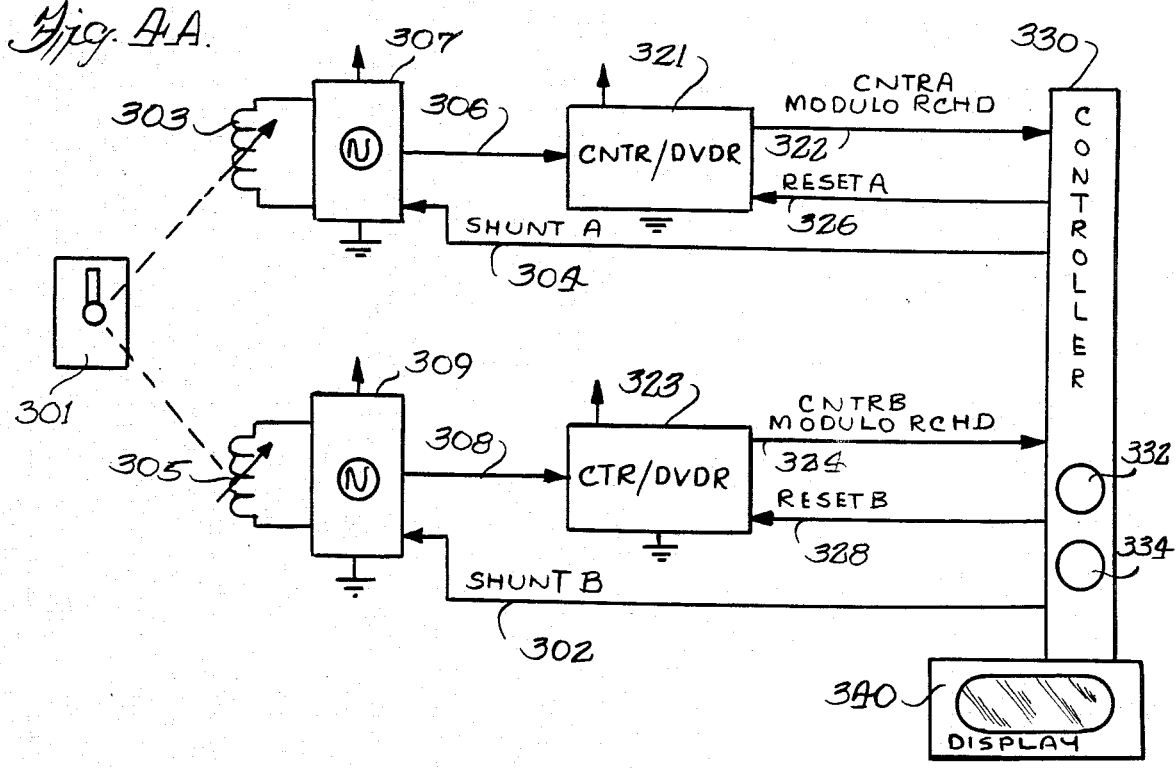
FIG. 4A is a block diagram of a multi-axis joystick illustrating parallel oscillator-parallel-counter apparatus for parallel operation.
Figure 5:
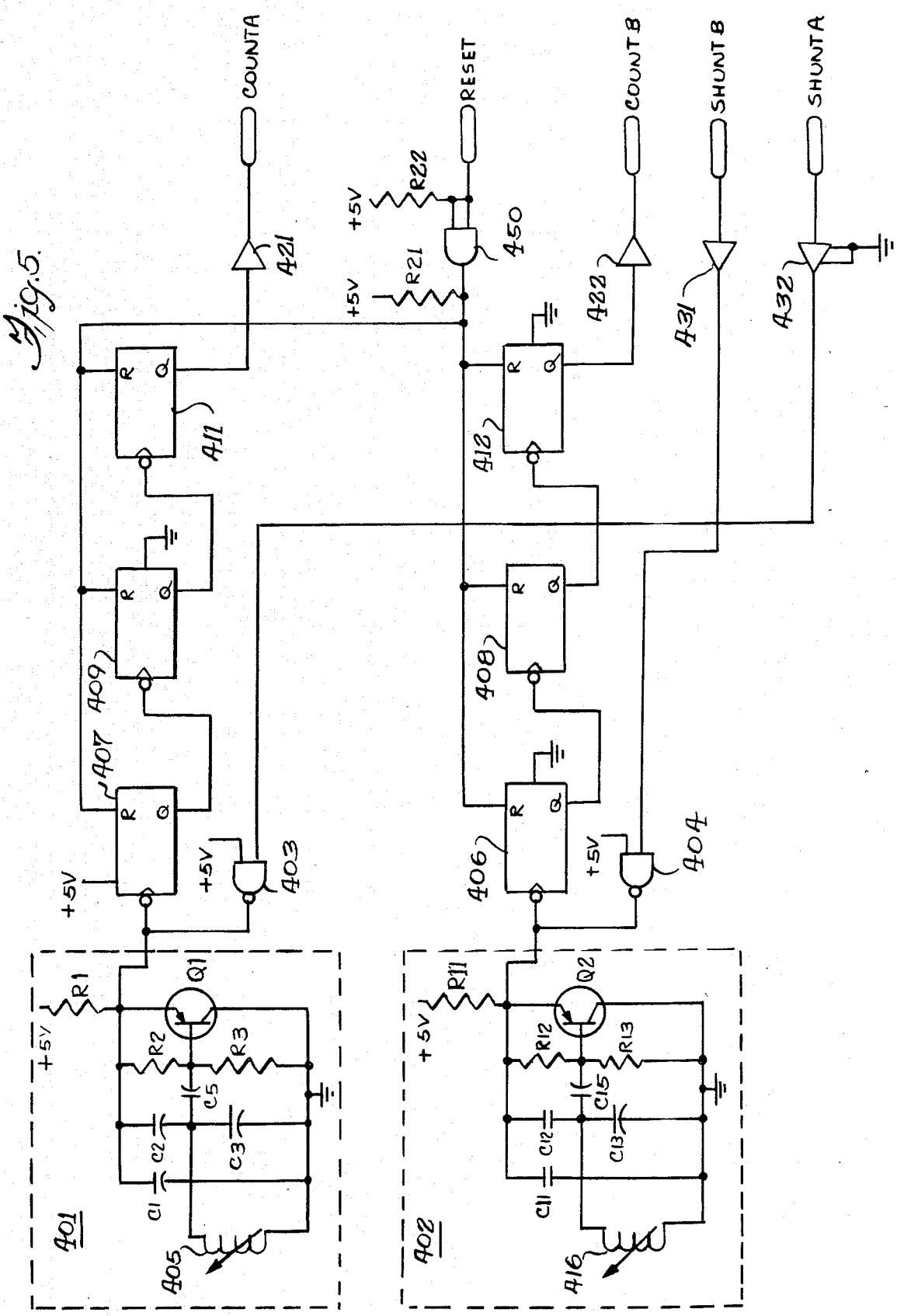
FIG. 5 is a detailed electrical schematic illustrating the system of FIG. 4A.

Referring to FIG. 4A, a video game system utilizing a parallel output x-y position transducer illustrating one embodiment of the present invention is shown. The video game system is comprised of a video display 340, a controller 330, counters 321 and 323, oscillators 307 and 309, variable inductors 303 and 305, and a control handle and linkage mechanism 301. The control handle and mechanical linkage 301 in conjunction with the variable inductors 303 and 305, oscillators 307 and 309, and counters 321 and 323 provide a player input transducer for converting physical movement to a multicoordinate set of variable width pulses. Each of the variable inductors 303 and 305 is comprised of an inductor having an associated movable slug within an associated core, as illustrated in FIG. 1B. The oscilators 307 and 309 provide means for producing an associated coordinate signal having a frequency proportional to the position of the associated respective slug relative to the associated respective core, which in conjunction with the associated counters 321 and 323, respectively, provides means for producing a signal having respective pulses changing widths proportional to the position of the respective slug relative to the respective core. The control handle and linkage 301 provide means for linking player physical movement to each of the respective slugs associated with the variable inductors 303 and 305 so as to provide for user positioning of the slugs in the first and second inductor cores responsive to movement of the control handle. The controller 330 comprises a logic sequencing circuit for outputting a control signal to control the display responsive to the player input transducer. The video display 340 provides a visual presentation of game action responsive, at least in part, to said control signal from the logic sequencing circuit 330. The controller 330 may be comprised of a central processing unit 332 and memory 334 and associated control logic, or may be comprised of other circuitry.

The counters 321 and 323 can include means for forcing the counter means stored count to a predetermined count value (e.g. zero) responsive to a corresponding reset signal, as described above with reference to FIG. 3B. As illustrated in FIG. 4A, the reset signals 326 and 328 for the counters 321 and 323, respectively, are output from the controller 330 which also receives the counter outputs 322 and 324 from the counters 321 and 323, respectively. The counter outputs, as described above with reference to FIG. 3B, can be indicative of a predetermined count being reached. Additionally, in the illustrated embodiment of FIG. 4A, the controller 330 outputs a shunt signal 304 and 302 to each of the oscillators 307 and 309, respectively, and provides means for selectively disabling the associated oscillator responsive to said shunt signal. In this way, the one oscillator 307 can be selectively inhibited while the other oscillator 309 is enabled for a first time interval, and the other oscillator 309 can be selectively inhibited while the first oscillator 307 is enabled for a second time interval. In the illustrated embodiment, the first time interval is at least the time between the first reset signal 326 or first shunt signal 304 and the first counter output 322, and the second time interval is at least the time interval between the second reset signal 328 or second shunt signal 302 and the second counter output 324.

Figure 4B:
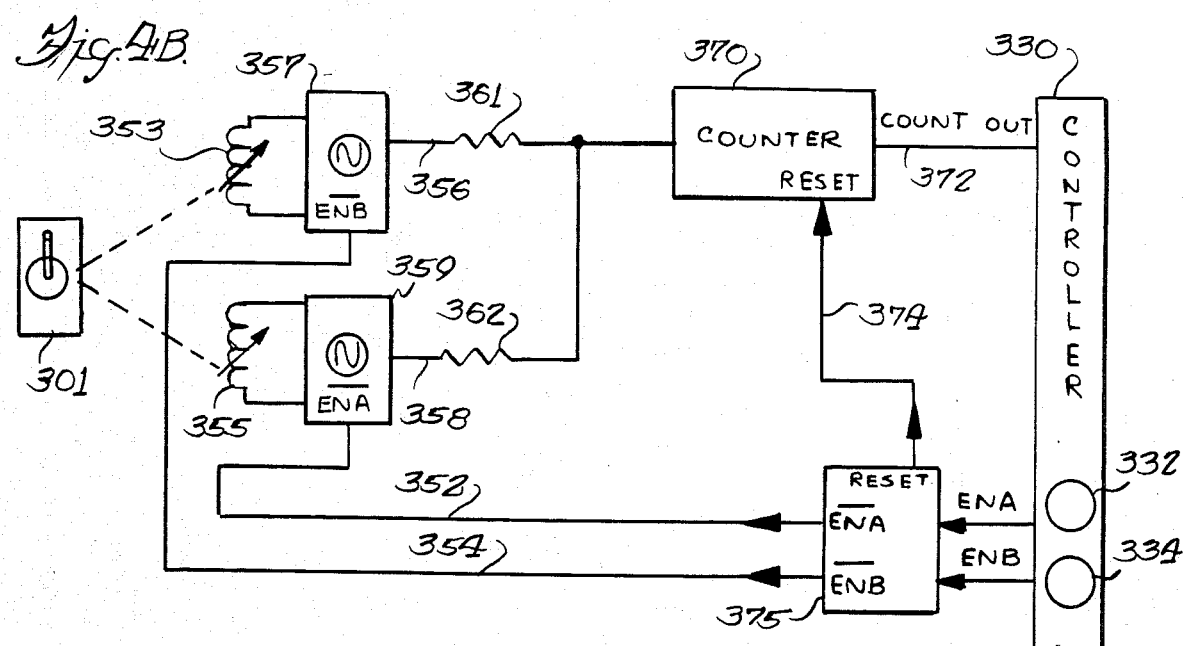
FIG. 4B is a block diagram of a multi-axis joystick illustrating parallel oscillator single counter apparatus for time-division-multiplexed sequential operation.

Referring to FIG. 4B, a video game system, such as that as shown in FIG. 4A, is shown utilizing a time-division-multiplexed-pulse-width-modulated sequential output x-y position transducer, illustrating another embodiment of the present invention. The video game system of FIG. 4B is comprised of a video display 340, a controller 330 (which can be comprised of a central processing unit 332 and memory 334 or other logic circuitry), selectively enabled oscillating circuits 357 and 359, associated variable inductors 353 and 355, a counter 370, control logic 375, and a control handle and linkage mechanism 301. The control handle and mechanical linkage 301 in conjunction with the variable inductors 303 and 305 and oscillators 357 and 359 selectively provide a player input transducer for converting movement of the control handle to a multicoordinate signal output. In conjunction with counter 370 and control logic 375, a pulse width modulated time division multiplexed sequential output train is achieved representing a multicoordinate set of variable width pulses. The oscillators 357 and 359 are alternately and exclusively enabled responsive to respective enabling signals 354 and 352, respectively. Each of the variable inductors 353 and 355 is comprised of an inductor having an associated movable slug within an associated core. The oscillators 357 and 359, when enabled, provide means for producing an associated coordinate signal having a frequency proportional to the position of the associated respective slug relative to the associated respective core. The controller 330 provides enabling signals ENA and ENB which alternately select and enable either oscillator 359 or oscillator 357, respectively, via control logic 375. Only one of the enable signals ENA or ENB is active at any given time, such that only one of the oscillators 359 and 357 are enabled at any one time. The control logic 375 provides a reset pulse 374 for coupling to the reset input of the counter 370 when either enable signal ENA or ENB is active. Alternatively, the reset signal 374 may be provided directly by the controller 330. Thus in operation the counter 370 is reset prior to the enabling of either oscillator, with reset signal 374 being brought to an inactive signal level responsive to either of the enable signals ENA or ENB being brought active. Thus, the counter is reset and counts to the predetermined value to provide a count output 372 for coupling to the controller 330, sequentially, responsive to operation of each of the oscillators 357 and 359. In this manner, the counter 370 is time shared between the oscillators 357 and 359.

In a preferred embodiment, the control handle of the control handle and linkage 301 is physically movable 360° about a center pivot point, and the linkage provides means for varying the tuning elements of the variable inductors 303 and 305 responsive to movement of the control handle. The oscillator outputs 306 and 308, and/or the counter outputs 322 and 324, provide coordinate signals defining the position of the control handle in the 360° movement plane about the center pivot point. The controller 330 provides means for outputting coordinate signals which define the position of the control handle in the 360° movement plane about the center pivot point responsive to the first and second counter outputs. The controller 330 includes means for controlling the display responsive to the coordinate signals, such that a portion of the visual presentation of the display is positionally varied responsive to the coordinate signals. Thus, the visual presentation of the display can be positionally varied in a 360° plane of movement on the display corresponding to the 360° plane of movement of the control handle. Furthermore, the controller 330 and display 340 can vary the rate of positional movement of the portion of the visual presentation proportional to the control handle movement. Thus, velocity, acceleration, and position of images of the visual presentation can be controlled responsive to the positional transducer of the present invention. Thus, the illustrated system of FIG. 4 provides means for modifying the video display responsive to the associated coordinate signals of the first and second inductor sets.

In an alternate embodiment of either of the systems of FIGS. 4A-B, the controller 330 includes means for providing first and second digital word outputs having a plurality of discrete values responsive to the first and second coordinate signals. Furthermore, means can be provided for producing one of a plurality of multi-bit data word outputs responsive to the coordinate signals associated with each of the variable inductors. For example, the time interval between the reset pulse and the count reached pulse can be equated to one of a plurality of binary values corresponding to one of a plurality of positions of the slug within the core of the variable inductor.

For increased angular rotational resolution for the same number of bits, the transducer sine-cosine encoding technique, representing another aspect of the present invention, can be used. Any type variable tuning element can be utilized with this technique, including variable capacitor, variable inductor or variable resistor in the variable oscillator circuitry. However, the discussion shall be related to variable inductors, as illustrated in FIGS. 4A-B. Where the two inductors are perpendicularly (transversely) oriented to one another, as shown in FIG. 1B, the outputs provided are related as sine and cosine, and can be provided as multiple bit binary (digital) values. Truncated sine-cosine encoding utilizes the fact that the sine (or cosine) value plus polarity of the other output (cosine or sine) defines the corresponding perpendicularly oriented value of cosine (or sine). Since the sine and cosine are 90° out of phase, when one value is changing rapidly the other will be changing slowly. Thus, by truncating that signal which is in its slow change portion and utilizing that value to show polarity, then the value of the other perpendicularly oriented signal can be used for a primary resolution value. Thus, the polarity and primary resolution value provide sufficient information to determine a secondary resolution value corresponding to the truncated output, thus yielding values for both the sine and cosine. For example, if all values beyond 0.7 of the peak value in the plus and minus direction from the other perpendicularly oriented value is read in detail for resolution, increased rotational angular resolution can be achieved for the same number of resolved bits by utilizing the polarity of one value (sine or cosine) and resolution of the other value (cosine or sine) to determine both values.

In any of the above-described embodiments of FIGS. 4A-B, means can be provided for accelerating movement of a portion of the video display presentation responsive to the rate of change per predetermined time interval of the coordinate signals associated with the first and second inductor sets, such as the counter outputs 322 and 324.

Referring to FIG. 5, a detailed electrical schematic diagram of the oscillator and counter circuitry of FIG. 4A is shown. A first variable inductor 405 in conjunction with capacitors C1, C2 and C3 and resistors R1, R2 and R3 and transistor Q1 form oscillator circuitry 401 which provides an oscillating output at a frequency which is variable responsive to the variable inductor 405. Resistor R1 couples the positive supply voltage Vcc (e.g., 5 volts) to the components of the oscillator circuitry 401. Thus, one side of resistor R1 couples to the 5 volt power supply, while the other side couples to a junction point coupling to other components of the oscillator circuitry 401, and to an oscillator output 504 for coupling to the 0 counter clock input of the counter comprising counters 407, 409, and 411 cascaded to functionally form a single counter in the illustrated embodiment of FIG. 5. A shunt signal 500 from an external controller, not shown in FIG. 5 (such as the controller 330 of FIG. 4), coupled via buffer amplifier 432 and via gate 403 to the oscillator output-resistor R1 junction for selectively shunting the junction of resistor R1 and the remaining oscillator circuitry to ground, thereby effectively removing power from the oscillator 401, and inhibiting operation of the oscillator 401. However, when the oscillator 401 is not disabled by the shunt signal 500, the oscillator output 504 couples to and clocks the clock input of counter 407. The most significant bit output of counter 407 is cascaded to the clock input of counter 409, and in a like manner the most significant bit output of counter 409 is cascaded to the clock input of counter 411. The most significant bit output of counter 411 is output via gate 421 as the first counter output for coupling to the remote controller (not shown in FIG. 5). A reset signal 520 is coupled from the remote controller (not shown in FIG. 5, such as controller 330 of FIG. 4) via gate 450 to the clear inputs of the counters 407, 409, and 411 to selectively reset the counters to a predefined count value (e.g., all zeros) responsive to the reset signal 520.

The second oscillator and counter stage of FIG. 5 parallels the operation and structure the first oscillator and first counters as described above for FIG. 5. The second oscillator 402 is comprised of variable inductor 416 and capacitors C11, C12, C13, resistors R12, R13 and R11, and transistor Q2, with resistor R11 coupling the positive supply voltage on one end to the junction of the oscillator output and other components of the oscillator 402 circuitry. A second shunt signal 501 is coupled from the remote controller (not shown in FIG. 5) via buffer amplifier 431 and gate 404 to the junction of the oscillator output resistor R11, to selectively shunt the junction of R11-oscillator output 502 to ground, thereby removing power from the oscillator circuitry and pulling the oscillator output to ground. This effectively disables the oscillator responsive to the shunt signal 501. When the shunt signal 501 is inactive, i.e., the oscillator 402 is operable, the oscillator output 502 couples to the clock input of counter 406 which is cascaded with counters 408 and 412, in the manner as descibed above with reference to counters 407, 409, and 411, with the most significant bit output of counter 412 coupling via buffer 422 as the second counter output for coupling to the remote controller (not shown in FIG. 5, such as controller 330 of FIG. 4). The counters 407, 409, 411, 406, 408, and 412 can be implemented utilizing conventional digital integrated circuits, such as the SN7493 or SN74393 TTL devices.

The selective shunting of oscillators 401 and 402 is utilized to eliminate the problem of interaction of perpendicularly positioned inductor coils such as are used in implementing the illustrated embodiment of an x-y joystick in conjunction with variable inductors 405 and 416. By this method, the two variable inductors can operate independently without distorting or changing the inductance of the other variable inductor, by alternatively shunting one oscillator while enabling the other to operate, and vice versa.

The use of variable inductors in the interactive joystick transducer has many practical advantages as well as improved resolution over prior joysticks utilizing leaf switches, and other techniques. For example, the symmetry of the slug within the core does not affect the inductance of the coil unless the core has physically worn through to the wire itself. Additionally, utilizing a ferrous slug within a glass-filled form improves reliability and reduces wear to neglible levels. Thus, improved reliability and increased mean time to failure relative to conventional joysticks is achieved.

The method and apparatus of converting the joystick coordinate outputs (e.g. counter outputs) to one of a plurality of values provides for much greater resolution with the present invention than is achievable in prior art joysticks utilizing leaf switches.

In accordance with one aspect of the present invention, the pulse width as determined from the reset pulse, shunt signal, and count reached output can be assigned one of a plurality of values within range, or be assigned an overrange or underrange value. Thus, for example, a counter (or timer) at the remote controller can count to a first predefined value (e.g., 256 counts) which represents the underrange limit, and can provide an underrange indication if the count value is within the first 256 counts. If not, the underrange indication is removed and the timer-counter counts again to the predefined value. If the received pulse is within this second count range, the count value is indicative of the position of the joystick and the slug within the variable inductor core, and is indicated as an in-range signal. If, however, the received pulse exceeds the second count to the predefined value, an overrange indication is set, and the count proceeds again to the predefined value. By utilizing this representation technique, the linearity is increased, and the pulse width range can be limited (e.g., to a 2 to 1 ratio of variance in the inductance). Since the core and slug determine the range of the coil, the movement of the slug determines the pulse width range. By limiting the pulse width range to a 2 to 1 or 3 to 1 ratio, greater linearity is achieved, and increased resolution is achieved with both overrange, underrange, and inrange indication.

Figure 6A:
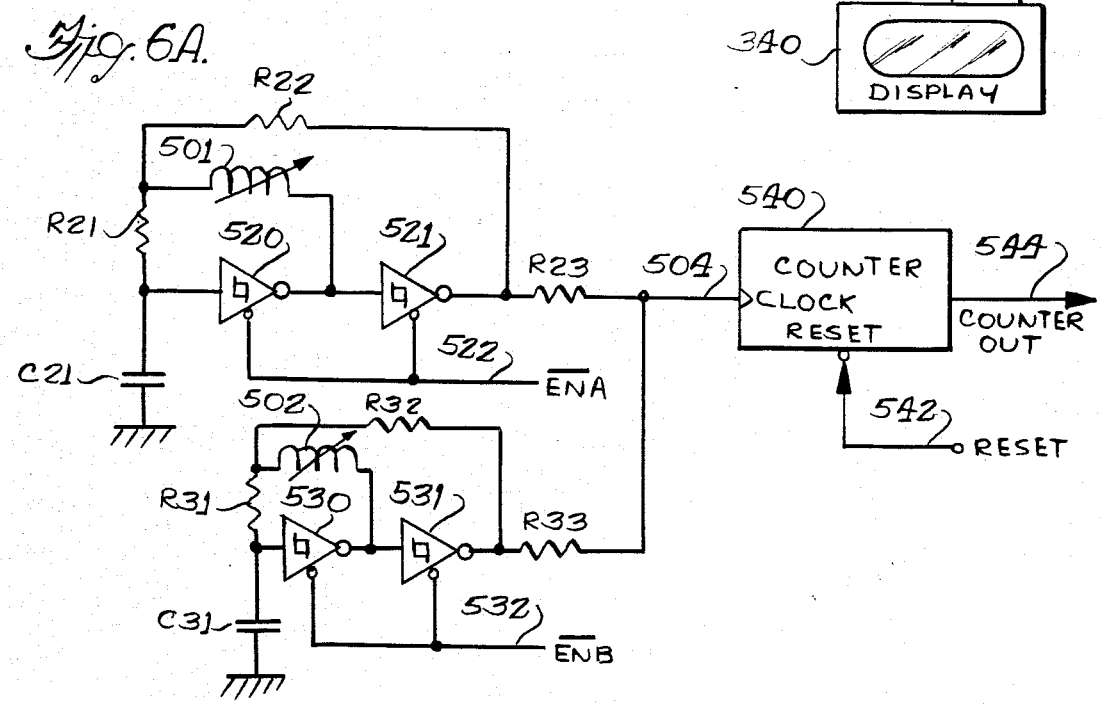
FIGS. 6A–6B are a detailed electrical schematic diagram illustrating the system of FIG. 4B.
Figure 6B:
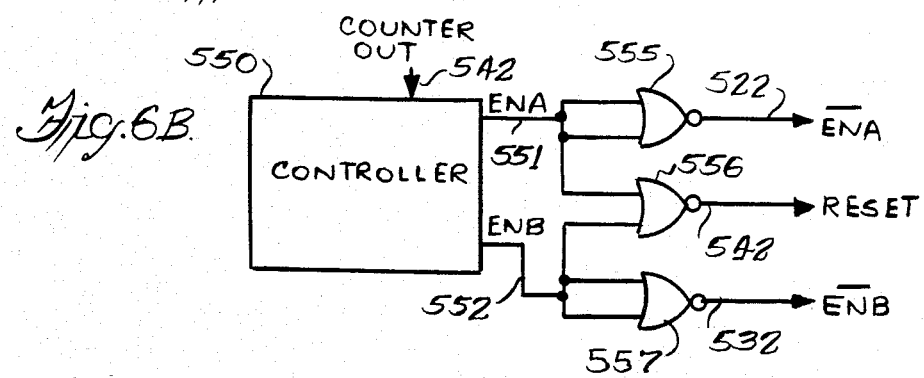

Referring to FIGS. 6A-B, a detailed electrical schematic diagram is shown illustrating one embodiment of specific electrical circuitry embodying a positional transducer, such as shown in FIG. 4B. The circuitry of 6A-B differs in many aspects from that shown in FIG. 5. First, the specific electronic circuitry utilized to embody the oscillators is different. Secondly, the control signals between the controller and the oscillators and counter of FIGS. 6A-B differ from those of FIG. 5. Thirdly, the system of FIGS. 6A-B utilize parallel oscillators employed in a time division multiplexed scheme with a single shared counter providing a pulse width modulated time division multiplexed system, while the system of FIG. 5 utilizes parallel oscillators and parallel counters, and either generates a multiplicity of pulses in parallel or achieves time division multiplexing by selective control of the oscillators as described above herein. Furthermore, the oscillators of FIG. 6A are relaxation oscillators.

Referring now specifically to FIG. 6A, detailed electrical circuitry is shown functionally parallelling the oscillator 357 and associated inductor 353, oscillator 359 and associated inductor 355, series resistors 361 and 362, and counter 370 of FIG. 4B. The equivalents of the controller 330 and control logic 375 of FIG. 4B are illustrated in FIG. 6B.

As shown in FIG. 6A, the two oscillators are of identical design, each comprising selectively enabled three state Schmitt trigger buffer amplifiers, feedback resistors, damping capacitor, and variable tuning inductor. Additionally, a series damping and isolation resistor is provided from the output of the oscillator prior to commonly coupling the oscillator outputs to the counter input. The oscillators are shown as comprised of three-state inverting Schmitt trigger amplifiers, selectively enabled with a tristate output, such as a 74 LS240 TTL device, or 74SC240 CMOS device, both being commercially available standard integrated circuits. The top oscillator of FIG. 6A is comprised of Schmitt trigger amplifiers 520 and 521. The output of amplifier 520 is coupled to the input of amplifier 521 and to one side of variable inductor 501. The output of amplifier 521 is coupled to one end of resistor R22 and to one end of resistor R23 which provides a series damping resistor for coupling via node 504 to the output of the oscillator from Schmitt trigger 521 to the input of the counter 540. The other end of each of resistor R22 and variable inductor 501 are coupled to each other and to one end of resistor R21. The other end of resistor R21 is coupled to the input of amplifier 520. Capacitor C21 is coupled between ground and the junction of the input of amplifier 520 and resistor R21, and in conjunction with resistor R21 provides damping so as to limit the range of frequency variation of the oscillator output occurring responsive to the variable inductor 501. Capacitor C21 is not necessary for oscillation, and is optional, depending upon the application and needs of the system. An enable signal $\overline{ENA}$, 522, when active low, selectively enables the Schmitt trigger amplifier 520 and 521 to an active responsive state so as to enable the upper oscillator to function and provide an output via resistor R23 to node 504 which couples to the clock input of the counter 540. A Reset signal 542 coupled to the Reset input of counter 540 resets the counter 540 to a predefined count value (e.g. zero) prior to the enabling of the upper oscillator. When the counter 540 reaches a predefined count, a counter output 544 is provided for coupling back to a controller, such as 550 of FIG. 6B.

The operation and physical construction of the lower oscillator is identical to that of the upper oscillator just described, with Schmitt trigger amplifiers 530 and 531 corresponding to amplifiers 520 and 521, resistors R31, R32, and R33 corresponding to resistors R21, R22, and R23, capacitor C31 corresponding to capacitor C21, variable inductor 502 corresponding to variable inductor 501, and the $\overline{ENB}$ signal 532 corresponding to the $\overline{ENA}$ signal 522. In a manner similar to that described above with reference to operation of the top oscillator in conjunction with the counter 540, the Reset signal 542 coupled to the Reset input of the counter 540 selectively resets the counter to the predefined value prior to the enabling of the lower oscillator, such that the counter 540 provides a counter output 544 when the lower oscillator has clocked the counter a predefined number of times to reach a predefined count value. The resistors R33 and R23 are commonly coupled at the junction 504 to the clock input of the counter 540. This creates no problem, since only one of the oscillators is enabled at any one time, the other oscillator presenting a high impedance load via the respective series damping resistor from the junction 504.

Referring now to FIG. 6B, the controller 550 is shown as providing two outputs ENA 551, and ENB 552. Only one of these outputs is active at any given time, with both outputs going inactive prior to the other output going active. The control logic is comprised of Nor gates 555, 556, and 557. The gates 555, 556, and 557 may form part of the position transducer remote from the controller 550, or may form a part of the controller 550. Gates 555 and 557 function as inverters, and may be replaced by such, to convert the ENA and ENB signals 551 and 552, respectively, to the inverse polarity $\overline{ENA}$ and $\overline{ENB}$ signals, 522 and 532, respectively. Nor gate 556 provides a logically gating of the ENA signal 551 and ENB signal 552 so as to provide a Reset output 542 only when both ENA and ENB, signals 551 and 552, respectively are at an inactive state. The Reset output 542, coupled to the counter 540 Reset input, is thus normally active, resetting the counter. When either oscillator is enabled via ENA or ENB signals 551 and 552, respectively, the Reset signal 542 is forced to an inactive signal level, thereby enabling the counter 540 to count to the predefined count value and provide the counter output 544, for coupling back to the controller 550. As described above, both the ENA and ENB signals are brought to an inactive signal level prior to alternating the enablement of either of the upper and lower oscillators. Therefore, the counter 540 is reset between the enabling of the two oscillators, assuring a proper counter output 544 during all phases of operation of the circuitry.

The use of a relaxation oscillator, as shown for the oscillators of FIG. 6A, provides for greater dynamic range of frequency variation responsive to a fixed variation of a variable inductor than is achievable with other oscillator types. However, other types of oscillator circuitry can be utilized, using different circuitry and different variable elements, consistent with the teachings of the present invention.

While there have been described above various embodiments of position transducers and video game systems using position transducers for the purpose of illustrating the manner in which the invention may be used to advantage, it will be appreciated that the invention is not limited to the disclosed embodiments. Accordingly, any modification, variation, or equivalent arrangement within the scope of the accompanying claims should be considered to be within the scope of the invention.

What is claimed is:

1. A position transducer system comprising:
   a first oscillator, having a first inductor having a first movable slug, for producing a first periodic waveform having its periodicity varied in response to the position of said first slug;
   a second oscillator, having a second inductor having a second movable slug, for producing a second periodic waveform having its periodicity varied in response to the position of said second slug;
   control means for moving at least one of said first and second slugs responsive to an external stimulus;
   counter means for providing counter outputs responsive to the periodicity of said first and second periodic waveforms;
   means for selectively enabling said first and second oscillators to alternatively and exclusively output each one of said first and second periodic waveforms and not to output said other one of said first and second periodic waveforms; and
   means for providing a signal for resetting said counter means prior to each enabling of either of said first and second oscillators.

2. The system as in claim 1 further comprising a controller which receives said counter outputs and which provides said signal for resetting said counter means.

3. The system as in claim 2 further comprising a display for providing a visual presentation wherein at least a portion of said presentation varies in response to said counter outputs.

4. The system as in claim 3 wherein said portion of said presentation moves across said display at a rate proportional to said counter outputs.

5. The system as in claim 1 wherein said control means comprises a control handle physically movable 360° about a center pivot point.

6. The system as in claim 5 further comprising means for outputting coordinate signals defining the position of the control handle in the 360° movement about the center pivot point responsive to said counter outputs.

7. The system as in claim 5 wherein said control handle is movable 360° about said center pivot point at variable radii.

8. The system as in claim 5 wherein said control handle is movable 360° about said center pivot point at a fixed radius.

9. A position transducer system comprising:
   a controller for receiving a counter output and for selectively providing first and second enable signal only one of which is active at any given time;
   a first oscillator, having a first variable tuning element therein, for producing a periodic first oscillator output signal at a frequency responsive to said first variable tuning element, said first oscillator being responsive to said first enable signal so that said first oscillator output signal is produced only when said first enable signal is active;
   a second oscillator, having a second variable tuning element therein, for producing a periodic second oscillator output signal at a frequency responsive to said second variable tuning element, said second oscillator being responsive to said second enable signal so that said second osciallator output signal is produced only when said second enable signal is active;
   means for outputting a reset signal in response to either of said first and second enable signals being active; and
   counter means for providing a counter output in response to being incremented to a predefined value, said counter means being reset to a predetermined count in response to said reset signal and being coupled to receive both said first and second oscillator output signals such that it is incremented in response to the oscillator selected by the active enable signal.

10. The system as in claim 9 wherein said first and second variable tuning elements are inductors.

11. The system as in claim 9 wherein said controller means is further comprised of:

first means for outputting a first digital output responsive to the time interval between said first enable signal and said counter output; and second means for outputting a second digital output responsive to the time interval between said second enable signal and said counter output.

12. The system as in claim 9 further comprising:
means for providing a display in which at least a portion of said display varies responsive to said counter output.

13. The system as in claim 12 wherein said display portion moves across the display at a rate proportional to said counter output.

14. The system as in claim 9, 11, or 12 further comprising:
a control handle; and
means for varying the first and second variable tuning elements responsive to movement of said control handle.

15. The system as in claim 9 further comprising:
a control handle physically movable 360° about a center pivot point, and means for varying said first and second tuning elements responsive to movement of said control handle.

16. The system as in claim 15 further comprising:
means for outputting coordinate signals defining the position of the control handle in the 360° movement about the center pivot point responsive to said counter output.

17. The system as in claim 16 wherein said coordinate signals define a plurality of discrete positions of movement for each of said variable tuning elements from the center pivot point of the handle.

18. The system as in claim 16 further comprising:
a display for providing a visual presentation wherein a portion of said presentation is positionally varied responsive to said coordinate signals.

19. The system as in claim 18 wherein said portion of said presentation is positionally varied in a 360° plane of movement corresponding to the movement of the control handle.

20. The system as in claim 18
wherein said rate of positional variation is proportional to said control handle movement.

21. The position transducer system as in claim 9 wherein said first and second variable tuning elements are capacitors.

22. A position transducer system comprising:
a controller for providing first and second reset signal outputs, and for receiving first and second counter outputs;
a first oscillator, having a first variable tuning element, for providing an output at a frequency responsive to said first variable tuning element;
a first counter means for providing a first counter output in response to being incremented to a first predefined value, said first counter means being reset to a predetermined count in response to said first signal and said first counter means being incremented in response to said first oscillator output;
a second oscillator, having a second variable tuning element, for providing a second output at a frequency responsive to said second variable tuning element;
a second counter means for providing a second counter output responsive to being incremented to a second predefined value, said second counter means being reset to a predetermined count responsive to said second reset signal and said counter means being incremented in response to said second oscillator output;
means for communicating said first and second counter outputs to said controller;
means for selectively inhibiting said second oscillator output and enabling said first oscillator output for a first time interval in response to a first inhibit signal; and
means for selectively inhibiting said first oscillator output and enabling said second oscillator output for a second time interval in response to a second inhibit signal.

23. The system as in claim 22 wherein said first and second variable tuning elements are inductors.

24. The system as in claim 22 wherein said controller is further comprised of:
first means for outputting a first digital output responsive to the time interval between said first reset signal and said first counter output; and
second means for outputting a second digital output responsive to the time interval between said second reset signal and said second counter output.

25. The system as in claim 22 further comprising:
means for providing a display in which at least a portion of said display varies responsive to said first and second counter outputs.

26. The system as in claim 25 wherein said display portion moves across the display at a rate proportional to the first and second counter outputs.

27. The system as in claim 22 further comprising:
a control handle; and
means for varying the first and second variable tuning elements responsive to movement of said control handle.

28. The system as in claim 22 wherein said first time interval is between said first reset signal and said first counter output, and wherein
said second time interval is between said second reset signal and said second counter output.

29. The system as in claim 22 further comprising:
a control handle physically movable 360° about a center pivot point, and means for varying said first and second tuning elements responsive to movement of said control handle.

30. The system as in claim 29 further characterized in that said handle is movable 360° about said center pivot point at variable radii.

31. The system as in claim 29 further characterized in that said handle is movable 360° about said center pivot point at a fixed radius.

32. The system as in claim 29 further comprising:
means for outputting coordinate signals defining the position of the control handle in the 360° movement about the center pivot point responsive to said first and second counter outputs.

33. The system as in claim 32 wherein said coordinate signals define a plurality of discrete positions of movement for each of said variable tuning elements from the center pivot point of the handle.

34. The system as in claim 32 further comprising:
a display for providing a visual presentation wherein a portion of said presentation is positionally varied responsive to said coordinate signals.

35. The system as in claim 34 wherein said portion of said presentation is positionally varied in a 360° plane of movement corresponding to the movement of the control handle.

36. The system as in claim 34 wherein said rate of positional variation is proportional to said control handle movement.

37. The system as in claim 22 wherein said controller is further comprised of:

means for outputting a first digital signal responsive to the elapsed time between said first reset signal and said first counter output; and means for outputting a second digital signal responsive to the elapsed time between said second reset signal and said second counter output.

38. The system as in claim 22 further characterized in that said controller is located remotely relative to said first and second oscillators and said first and second counters.

39. The position transducer system as in claim 22 wherein said first and second variable tuning elements are capacitors.

* * * * *

UNITED STATES PATENT AND TRADEMARK OFFICE
CERTIFICATE OF CORRECTION

PATENT NO. : 4,685,678

DATED : August 11, 1987

INVENTOR(S) : Jeffrey E. Frederikson

It is certified that error appears in the above-identified patent and that said Letters Patent is hereby corrected as shown below:

Col. 8, line 14, delete "0"

Col. 12, line 37, change "signal" to -- signals --

Col. 13, line 59, after "first" (first occurrence) insert -- reset--

Signed and Sealed this

Nineteenth Day of January, 1988

Attest:

DONALD J. QUIGG

Attesting Officer    Commissioner of Patents and Trademarks